July 14, 1925.

C. G. RICHARDSON

MACHINE FOR SHEARING CLOTH

Filed Feb. 27, 1920

Inventor:
C. G. Richardson
by
Geo. N. Goddard, Atty.

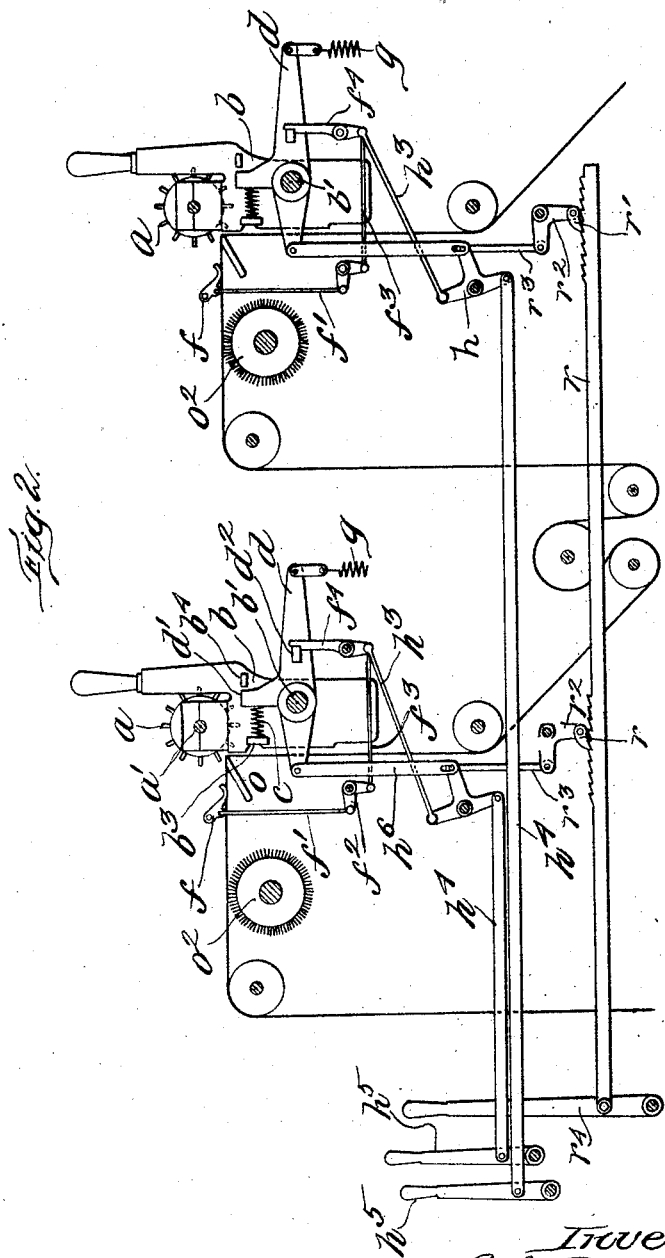

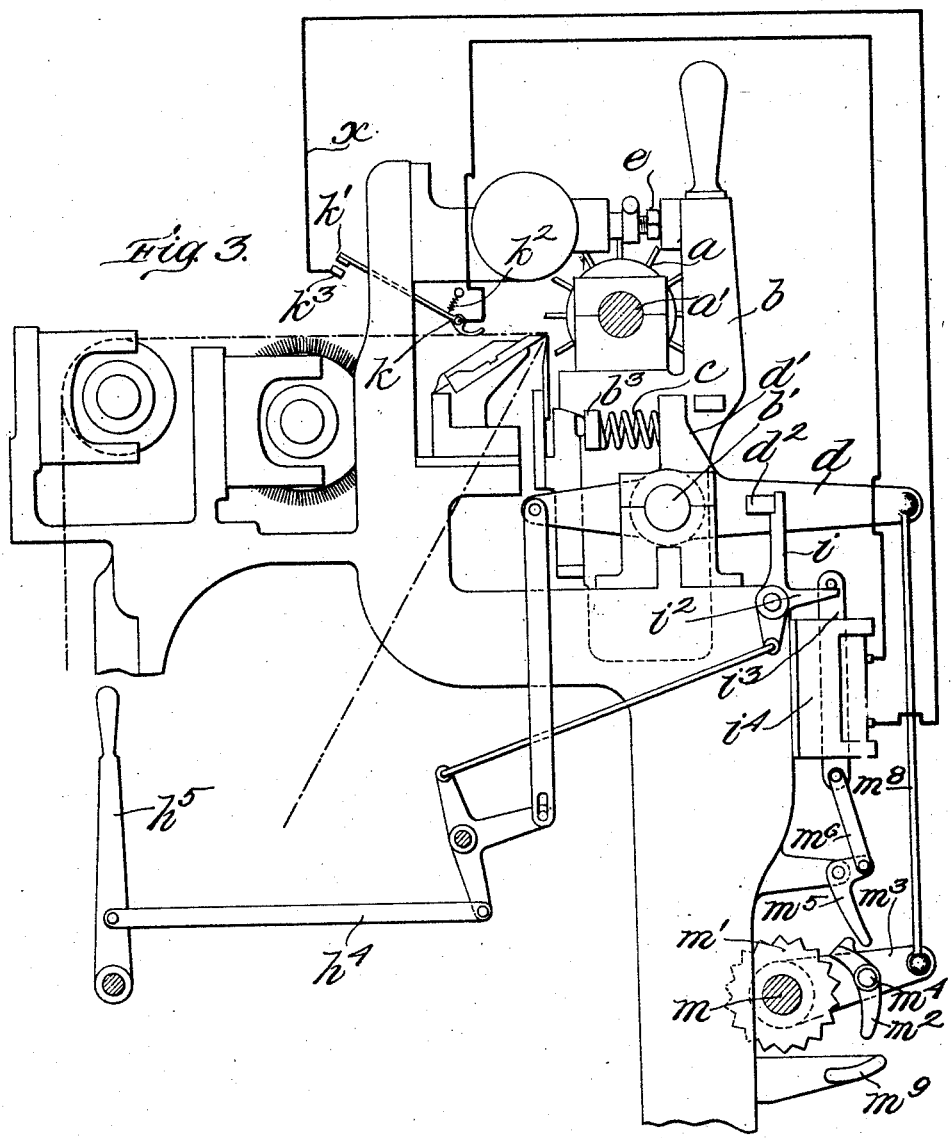

July 14, 1925.
C. G. RICHARDSON
MACHINE FOR SHEARING CLOTH
Filed Feb. 27, 1920
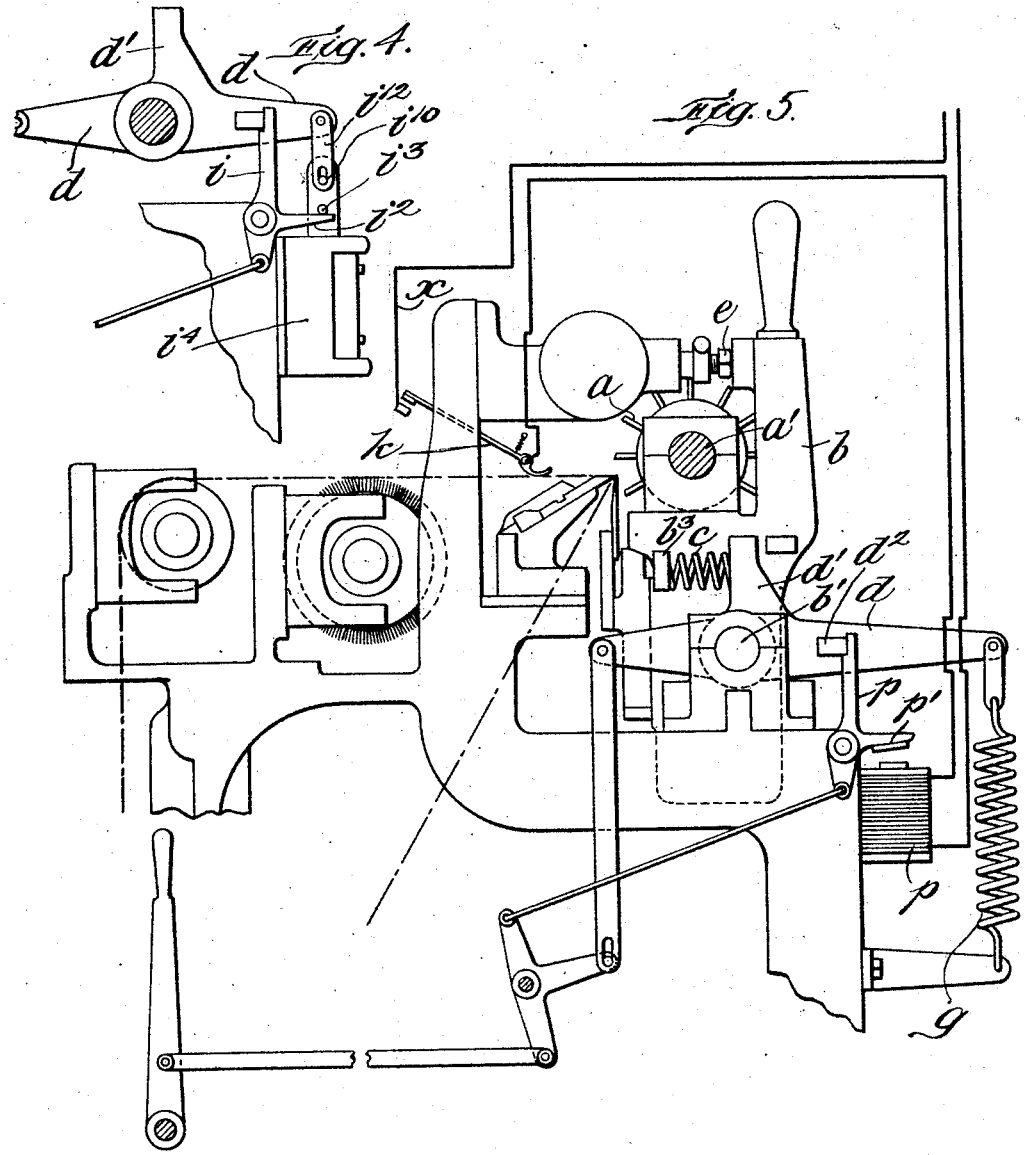

Patented July 14, 1925.

1,545,519

UNITED STATES PATENT OFFICE.

CHARLES G. RICHARDSON, OF SPRINGFIELD, VERMONT, ASSIGNOR TO PARKS & WOOLSON MACHINE COMPANY, OF SPRINGFIELD, VERMONT, A CORPORATION OF VERMONT.

MACHINE FOR SHEARING CLOTH.

Application filed February 27, 1920. Serial No. 361,637.

*To all whom it may concern:*

Be it known that I, CHARLES G. RICHARDSON, a citizen of the United States, and resident of Springfield, in the county of Windsor and State of Vermont, have invented certain new and useful Improvements in Machines for Shearing Cloth, of which the following is a specification.

This invention relates to machines for shearing cloth and is intended to provide a simple, reliable and efficient means for automatically protecting the cloth against being cut by the shear blade when a fold or sewing or seam or other extra thickness of the fabric is approaching the shear blade.

In cloth shearing machines it is customary before shearing the nap to sew together the two ends of the piece of cloth to form an endless belt thereof in order to facilitate feeding the cloth continuously through the machine any desired number of times without interruption. This sewing or seam produces a bunch or extra thickness which, if allowed to pass between the cloth rest and shear blade when they are in normal operative relationship to each other, would cut and injure the cloth. The same result might occur in case any fold or extra thickness of the cloth due to any cause were to be presented to the co-operating shear and rest unless they are separated to allow the passage between them of such extra thickness. By the present invention the cloth is automatically protected by devices automatically set in action by the seam or fold of the cloth itself as it approaches the shearing blade which devices act to temporarily separate the shear blade from the cloth rest sufficiently to permit the seam to pass between without injury to the cloth. The means set in action by the seam to effect this movement of the shear blade may be wholly mechanical or it may be electrically operated or it may be partly mechanical and partly electrical in its operation. The principle of the invention is equally applicable to a single blade shear or to a multiple blade shear as will be hereinafter explained.

In its main features the invention comprises the combination with a shear blade and a cloth rest, of means for automatically separating the shear from the cloth rest to permit passage of the seam, said automatic means being set in action through the agency of the approaching seam itself. The mechanism is so constructed that the shear may be also controlled by hand without interfering with the automatic mechansm and may be restored to normal operative position by hand so that the operator retains entire control independently of the automatic shear-blade raising means if desired.

In the accompanying drawings I have illustrated several different forms embodying the principles of this invention in which:

Figure 2 is a side elevation similar to Figure 1 showing the application of the mechanically operated blade resting mechanism applied to a double blade shear;

Figure 3 is a side elevation of a modified form of the apparatus which is partly electrical in its action;

Figure 4 is a detail view illustrating the use of an electric solenoid for both releasing the latch and raising the blade;

Figure 5 is a side elevation showing the electric solenoid arranged both to release the latch and to set in operation a mechanical train which raises the blade.

Figure 1:
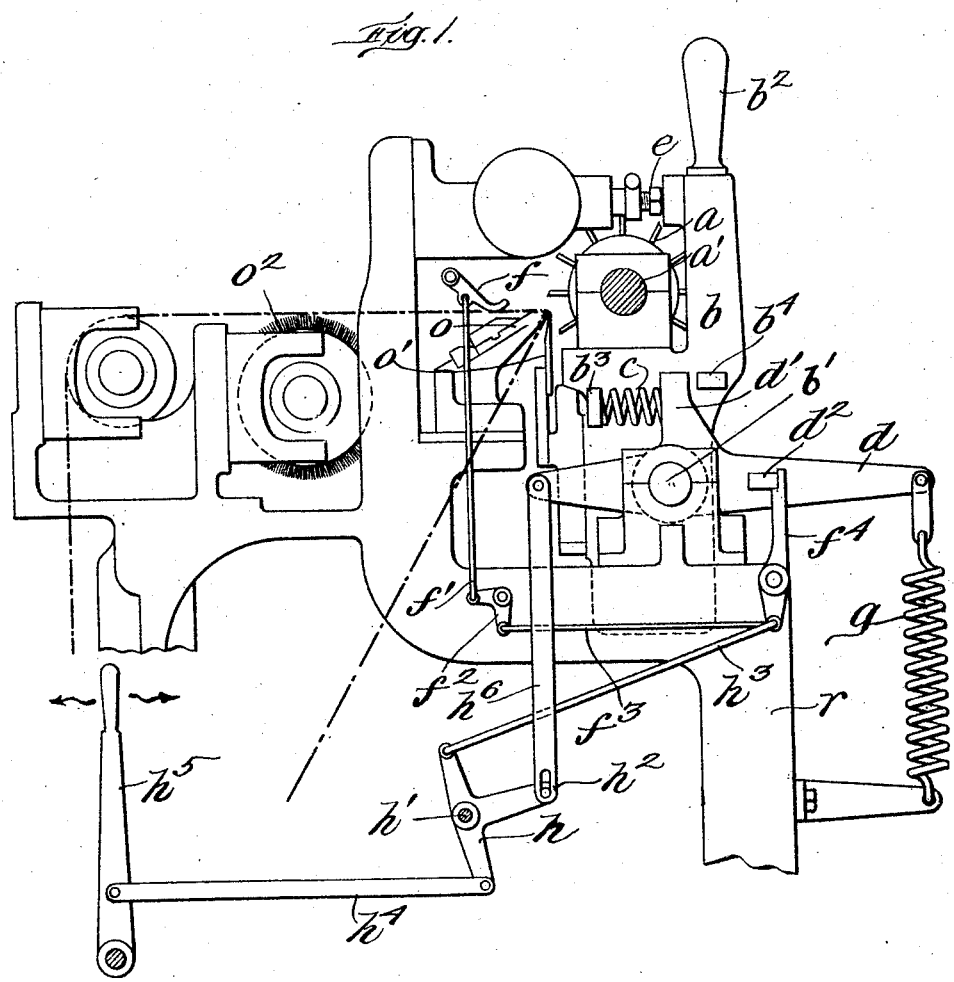
Figure 1 is a side elevation showing the cloth rest, the rotary shear blade and the shear blade positioning mechanism which is wholly mechanical.

In Figure 1 I have shown the automatic mechanism for controlling the position of the shear blade actuated entirely through mechanical connections, so much of the shear itself being shown as will make clear the operation of the device.

In this case the shear blade $a$ is mounted on the rotary shaft $a'$ which is carried in bearings in the blade frame $b$ which is pivoted on trunnions $b'$ in the main frame $r$ of the machine. The pivotal blade frame $b$ is provided with a hand lever $b^2$ for direct manipulation and has a thrust lug $b^3$ to receive the thrust or pressure of a compressed spring $c$ whose other end abuts against the arm $d'$ of the lever $d$ thereby yieldingly pressing the pivotal blade frame $b$ against the adjustable dial screws $e$ to maintain the blade in proper operative position of adjustment in relation to the cloth rest $o$.

The blade frame $b$ is provided with a lug or boss $b^4$ adjacent to the arm $d'$ but normally slightly separated therefrom to provide some lost motion, and when engaged by the arm $d'$ during the clockwise movement of the lever $d$, its axis serves to transmit swinging movement of said lever $d$ to the blade frame and raise or move the blade frame away from the cloth rest.

In order to prevent the blade shifting movement of the lever $d$ during the normal operation of the machine I provide a pivoted latch or stop finger $f^4$ arranged to swing into holding engagement with a lug or shoulder $d^2$ properly located on the arm $d$ so as to maintain the arm $d$ against pivotal movement.

The cloth rest $o$, the ledger blade $o'$ and the flock brush $o^2$ are arranged in the usual manner and relationship to the travelling cloth whose position of travel is shown in dotted lines in the different figures.

In the form of the invention shown in Figure 1 there is pivoted immediately in front of the cloth rest a cloth contacting finger or member $f$ which has operative connection with the latch or stop finger $f^4$ by means of the link or connecting rod $f'$, the crank lever $f^2$ and the link $f^3$. When the seam or other extra thickness of cloth passes beneath the member $f$ it acts to slightly raise or lift member $f$ which motion being transmitted through the connections leading to the latch $f^4$ moves the latch out of engagement with the blade moving lever $d$ to swing on its pivotal axis $b'$ under the tension of the actuating spring $g$. By means of the operative engagement between the arm $d'$ and the lug $b^4$ the shear blade frame is raised or moved away from the cloth rest to allow the passage between the blade and the cloth rest of the seam or other extra thickness of cloth.

To provide for the restoration of the shear blade to its normal operative position after the seam has passed the blade I provide a hand lever $h^5$ having suitable connections, such for example as link $h^4$ the lever $h$ and the link $h^3$, with the latch $f^4$ to manipulate the latch and also having a further link connection $h^6$ with the front end of the lever $d$ for shifting the lever $d$ so as to move the shear blade either into or out of normal operative position as may be desired. In order to disengage the latch $f^4$ from the projection of the lever $d$ the link $h^6$ has a slot and pin connection as shown at $h^2$ with the three arm lever $h$ which is mounted on the stud or shaft $h'$ for pivotal support. This slot or pin engagement provides a slight lost motion so as to permit the latch $f^4$ to be disengaged before movement is transmitted through the link $h^6$ to the blade shifting lever $d$. By movement in a forward direction toward the front of the machine or toward the left, according to the illustration in Figure 1, both the lever $d$ and the latch $f^4$ are successively restored to operative position. Movement of this hand lever $h^5$ toward the rear of the machine or toward the right in Figure 1 permits the operator to manually shift the blade from operative relationship to the cloth rest, thereby maintaining manual control of the shear blade at all times without interfering with the automatic action caused by the seam actuated member $f$ and its connections leading to the lever $d$ already described.

In Figure 2 I have shown how the shear blades of a multiple blade shearing machine may be similarly controlled, in this case the automatic blade shifting mechanism for each blade being controlled by similar trains of mechanism and the manual control being maintained through separate levers and link connections of similar construction extending to each shear blade mechanism whether there be two or more shears, the mechanism being duplicated for each shear.

In Figure 3 I have shown how the operative control of the shear blade may be effected through the agency of an electric circuit which is automatically energized by means of a suitable seam actuated member.

In this case the shear blade $a$ is mounted on the shaft $a'$ in the pivotal frame $b$ movable upon the axis $b'$ with the adjustable dial screw $e$, the lug $b^3$, spring $c$ and the arm $d'$ forming part of the lever $d$ with its stop lug $d^2$ may be precisely the same in construction and arrangement as that above explained.

In this case, however, the latch $i$ is provided with a projecting arm $i^2$ engaged by a pin secured to the movable core or plunger $i^3$ of the electric solenoid $i^4$. Mounted on the lower part of the frame is a continuously rotating shaft $m$ on which is secured a ratchet $m'$; a pivoted pawl $m^2$ mounted on the lever $m^3$ normally remains out of engagement with said ratchet $m'$ by the action of its own unbalanced weight or by means of a torsion spring $m^4$. Adjacent to the upper end of said pawl is pivoted a pawl actuating finger $m^5$ connected by means of a link $m^6$ with the lower end of the solenoid plunger.

Adjacent to the cloth rest and immediately above the cloth is pivoted a light finger or similar actuated member $k$ forming in effect the switch in an electric circuit $x$, the free end $k'$ of said lever forming an electric terminal in said circuit which is normally kept open or out of contact with the opposing terminal $k^3$ by means of a light tension spring $k^2$. The electric circuit $x$ leads to the solenoid $i^4$ so that when the circuit is closed the solenoid is energized and the plunger $i^3$ which is normally kept in a raised position is drawn downwardly thereby releasing in its first movement the latch $i$ from operative engagement with the lever $d$. The further traverse of the solenoid acts to swing the pawl engaging lever $m^5$ so as to move the pawl into engagement with the continuously rotating ratchet wheel $m'$ thereby locking the lever $m^3$ to the pawl temporarily and thus pulling down the lever $m^3$ which, acting through the link connection $m^8$, pulls down the lever $d$ thereby swinging the arm $d$ downwardly to shift the blade away from the cloth rest. After a short traverse the pawl $m$ strikes against the knock-off plate or bracket $m^9$ which disengages the pawl from the ratchet to prevent further travel of the arm $m^3$. The weight of the parts tends to keep the blade frame in its inoperative position away from the cloth rest until it is shifted back to operative position by means of the hand lever $h^5$ and its intermediate link and lever connections whose construction and arrangement has already been explained.

In Figure 4 I have illustrated the modification of the actuating mechanism containing the solenoid, by omitting entirely the ratchet and pawl mechanical movement and utilizing a solenoid of sufficient strength to shift the blade frame itself without the intervention of any other mechanism. In this case the solenoid $i^4$ has the one-way engagement with the arm $i^2$ through the pin on the solenoid plunger $i^3$ as shown in Figure 3, but here the solenoid is provided with an additional pin $i^{10}$ projecting through a slot in the link $i^{12}$ which forms a pivotal lost motion connection with the lever $d$. It will be seen that in both the forms shown in Figures 3 and 4 there is provision made for lost motion to permit the latch $i$ to be disengaged from operative connection with the lever $d$ before the lever actuating mechanism begins to swing the lever $d$.

A combined mechanical and electrical train of mechanism for controlling the blade frame is shown in Figure 5 in which construction the seam or cloth actuated member $k$ forms a circuit closing member for closing the circuit $x$ in precisely the manner already described in reference to the form of Figure 3, and other parts of the actuating mechanism may be similar in arrangement to that already described in Figure 1 except that an electromagnet $p$ is placed in the electric circuit $x$ and is located in position so that its core when magnetized will pull down the soft iron member $p'$ forming part of the latch $p$ so as to disengage the latch from the blade shifting lever $d$. As soon as this disengagement or release of the lever $d$ has been effected the tension spring $g$ acts to pull down the lever and swing over the blade frame.

By using the electromagnet a very much weaker current may be employed than in the case where the solenoid is used as the actuating member. The magnet will be much less expensive than the solenoid besides requiring a less powerful current to cause it to act.

In all the forms precisely the same manual control may be effectively used and in each case it will be found that proper provision has been made for releasing the latch or detent by a separate connection so as to permit the devices for actuating the blade shifting lever to act effectively.

To throw all blades back to operative position simultaneously I provide a shifting rod $r$ having ratchet teeth arranged to engage pawls $r'$ carried by angle levers $r^2$ connected with levers $h$ by means of links $r^3$. The operator by pushing on operating lever $r^4$ restores all blades to normal working position.

What I claim is:—

1. In a cloth shearing machine, the combination of plural shear blades, a seam actuated member arranged to engage the cloth in front of each blade, means for automatically shifting each blade out of operative position, said shifting means being set in operation through the agency of its corresponding seam actuated member, and manually controlled means located at the front of the machine to restore each blade singly or all blades together to operative position, substantially as described.

2. In a cloth shearing machine, the combination of a pivotally mounted blade frame, a shear blade operatively mounted therein, a blade shifting lever having yielding spring engagement with the shear blade frame to maintain the shear normally in operative position and having interlocking engagement with said blade frame to shift it from operative position in the reverse direction, means for actuating said lever in said reverse direction, means for preventing the movement of said lever in said reverse direction, and means controlled by contact with the cloth approaching the shear blade for releasing said preventing means and allowing the lever actuating mechanism to operate, substantially as described.

3. In a cloth shearing machine, the combination with a cloth rest, of a rotary shear and its movable supporting head, a pivotal lever arranged to normally exert a yielding pressure against the shear support in a direction to maintain the shear in operative shearing position, means tending to move said lever in the reverse direction to cause movement of the shear away from the cloth rest, a detent normally acting to prevent such reverse movement of the lever, and means operated by contact with the traveling cloth seam, approaching the cloth rest, to release said detent and permit said lever to shift the shear to inactive position, substantially as described.

4. In a cloth shearing machine, the combination with a cloth rest and a ledger blade, of a rotary shear and its supporting means, a shifting lever acting normally to maintain the shear-supporting head in operative position to the cloth rest, means tending to move said lever in the reverse direction and thereby cause the shear supporting head to move to inactive position, a detent engaging said shifting lever to prevent such reverse movement, and seam-actuated means arranged, when engaged with the cloth seam approaching the cloth rest, to release said detent and cause said lever, by its automatic movement, to shift the shear away from the cloth rest, substantially as described.

5. In a cloth shearing machine, the combination with a cloth rest, of a rotary shear blade and its movable supporting head, a blade-shifting lever acting through an interposed spring to yieldingly maintain the head in position while allowing the head to be moved against the action of said spring without moving the lever, means normally tending to move said lever in a direction to shift the head and its blade away from shearing position, and a seam-controlled detent arranged to prevent such shifting movement until released through the action of a cloth seam approaching the cloth rest, substantially as described.

6. In a cloth shearing machine, the combination of a movable head, a rotary shear mounted therein, an oscillatory lever arranged to exert a spring thrust in one direction to yieldingly maintain the cloth shear in operative position, means tending to cause movement of said head in a reverse direction to move the shear away from the cloth rest, seam-controlled means acting normally to prevent such reverse movement, and hand-shifting means arranged to shift the shear-supporting head in either direction at will independently of the automatic shear-shifting means, substantially as described.

7. In a machine for shearing cloth, the combination of a movable head, a rotary shear member mounted thereon, means for normally retaining the shear blade in operative shearing position, seam-controlled means for automatically releasing the shear from shearing position, and a hand lever for shifting the shear to either its operative or inoperative position, regardless of the position of the automatic releasing mechanism, substantially as described.

8. In a cloth shearing machine, the combination with a cloth rest, of a movable head, a rotary shear mounted in said head, a rock-arm having lost motion connection with said head normally maintaining the shear in shearing position, means for causing said rock-arm to shift the shear away from the cloth rest, means for keeping said shifting means inoperative until released by the action of the cloth seam approaching the cloth rest, substantially as described.

9. In a cloth shearing machine, the combination of a cloth rest, of a movable shear supporting head, a shear rotatably carried thereby, an actuating shifting lever normally acting to retain the shear in operative shearing position through spring tension and tending to shift the shear in the opposite direction when released, a detent operatively connected with a seam-actuated member arranged in front of the shear whereby the cloth seam, approaching the shear, causes the detent to be released and to permit movement of the shear to inoperative position, and hand-actuated means connected with both said detent and said lever to restore the parts to normal shearing position, substantially as described.

10. In a cloth shearing machine, the combination with a cloth rest, a rotary shear, a pivotally mounted supporting head therefor, a shifting lever having lost motion connection with said supporting head to shift the shear to or from operative position while normally maintaining the shear in its operative position, a detent for preventing the lever from shifting the shear away from the cloth rest, a cloth-seam actuated member acting to release said preventing means when moved by the seam approaching the cloth rest, hand-controlled mechanism combined with said lever and said detent to restore the lever and the detent in position to maintain the shear in operative relation, substantially as described.

11. In a cloth shearing machine, the combination with plural cloth rests, of cooperating rotary shears each mounted in a movable supporting head, automatic seam-controlled means for causing movement of each of said shears independently of the other away from said cloth rests, and seam-actuated elements arranged in advance of the respective shears to release the shifting mechanism of its shear as the cloth seam approaches its cloth rest, and manually operated mechanism for restoring either of said shear blades separately or all simultaneously to operative position, substantially as described.

12. In a cloth shearing machine, the combination of a cloth rest, of a rotary shear blade mounted in a movable supporting head, a lever arranged adjacent to said head and acting upon said head by means of an interposed spring to maintain the rotary shear in operative shearing position, a spring normally acting to move said lever to position to shift said shear away from the cloth rest, a detent normally arranged to prevent said spring from actuating said lever, seam-controlled devices arranged to release said detent when set in operation by contact with the cloth seam approaching the shear, and a hand lever having a link connection with the shifting lever and a link connection with the detent whereby the position of the shear may always be controlled independently of the automatic shearing means, substantially as described.

In witness whereof I have subscribed the above specification.

CHARLES G. RICHARDSON.